United States Patent [19]

Liang et al.

[11] Patent Number: 5,701,230

[45] Date of Patent: Dec. 23, 1997

[54] PORTABLE COMPUTER WITH THIN COMPARTMENT FOR RECEIVING A FLAT ARTICLE THEREIN

[75] Inventors: Andrew Liang; Lilian Cheng; Gwo Chyuan Chen, all of Taipei, Taiwan

[73] Assignee: Quanta Computer Inc., Taipei, Taiwan

[21] Appl. No.: 584,327

[22] Filed: Jan. 11, 1996

[51] Int. Cl.$^6$ ............................... G06F 1/16; H05K 5/03

[52] U.S. Cl. .............................................. 361/681; 361/683

[58] Field of Search ........................... 40/642, 776, 777, 40/642.01, 642.02; 283/74; 364/708.1; 361/679, 683, 681

[56] References Cited

U.S. PATENT DOCUMENTS 5,592,361   1/1997   Smith et al. ............................ 361/679

*Primary Examiner*—Michael W. Phillips
*Attorney, Agent, or Firm*—Finnegan, Henderson, Farabow, Garrett & Dunner

[57] ABSTRACT

A portable computer includes an upper housing which has an inner surface with a display provided thereon, and a lower housing which is connected pivotally to the upper housing and which has an inner surface with a keyboard device provided thereon. One of the upper and lower housings has an outer surface provided with a thin compartment for receiving a flat article therein.

4 Claims, 4 Drawing Sheets

PORTABLE COMPUTER WITH THIN COMPARTMENT FOR RECEIVING A FLAT ARTICLE THEREIN

BACKGROUND OF THE INVENTION

1. Field of the Invention

This invention relates to a portable computer, more particularly to a portable computer having a housing that is formed with a thin compartment for receiving a flat article therein.

2. Description of the Related Art

In this age of rapid development in computer technology, portable computers are more and more popular due to their light weight, compact size and mobility characteristics. However, the conventional portable computers are not provided with a storing space for receiving a disk therein when the disk is not in use. Therefore, an additional casing must be provided for the storage of a disk when the disk is not in use, thereby inconveniencing the user in view of the need to carry a portable computer with an additional storing casing. Furthermore, since the conventional portable computers have similar outer appearances, and since the conventional portable computers are not provided with a potentiality for identification, a case of taking another person's portable computer by mistake may occur.

SUMMARY OF THE INVENTION

Therefore, the main objective of the present invention is to provide a portable computer having a housing that is formed with a thin compartment for receiving a flat article therein.

Another objective of the present invention is to provide a portable computer which is provided with a potentiality for identification so as to prevent the occurrence of taking another person's portable computer by mistake.

According to one aspect of the present invention, a portable computer includes an upper housing which has an inner surface with a display means provided thereon, and a lower housing which is connected pivotally to the upper housing and which has an inner surface with a keyboard device provided thereon. One of the upper and lower housings has an outer surface provided with a thin compartment for receiving a flat article therein.

In the preferred embodiment, the upper housing has a transparent lid member which is mounted thereon and which cooperates with the outer surface thereof to define the compartment.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
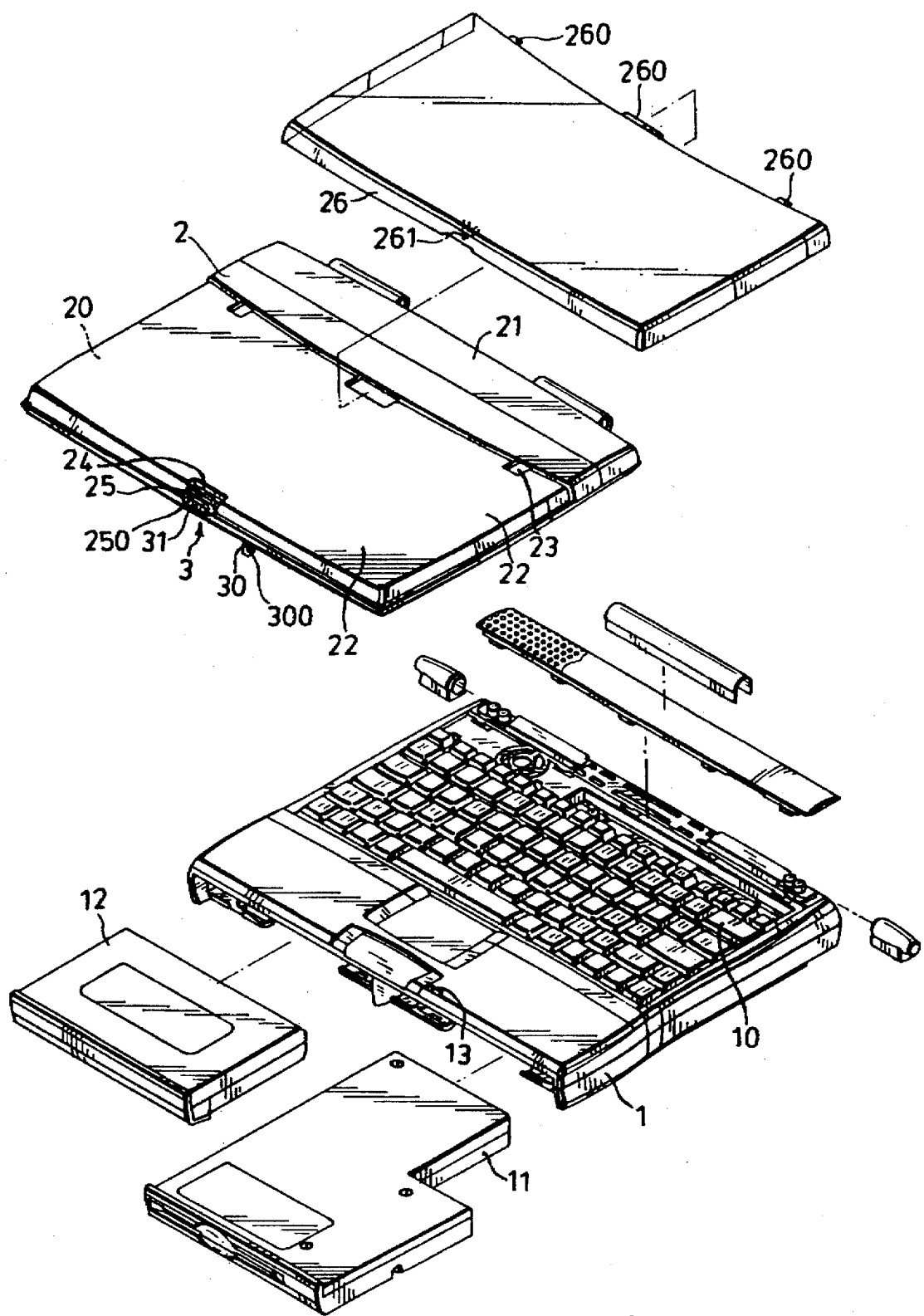
FIG. 1 is a partially exploded view of a first preferred embodiment of a portable computer according to the present invention.
Figure 2:
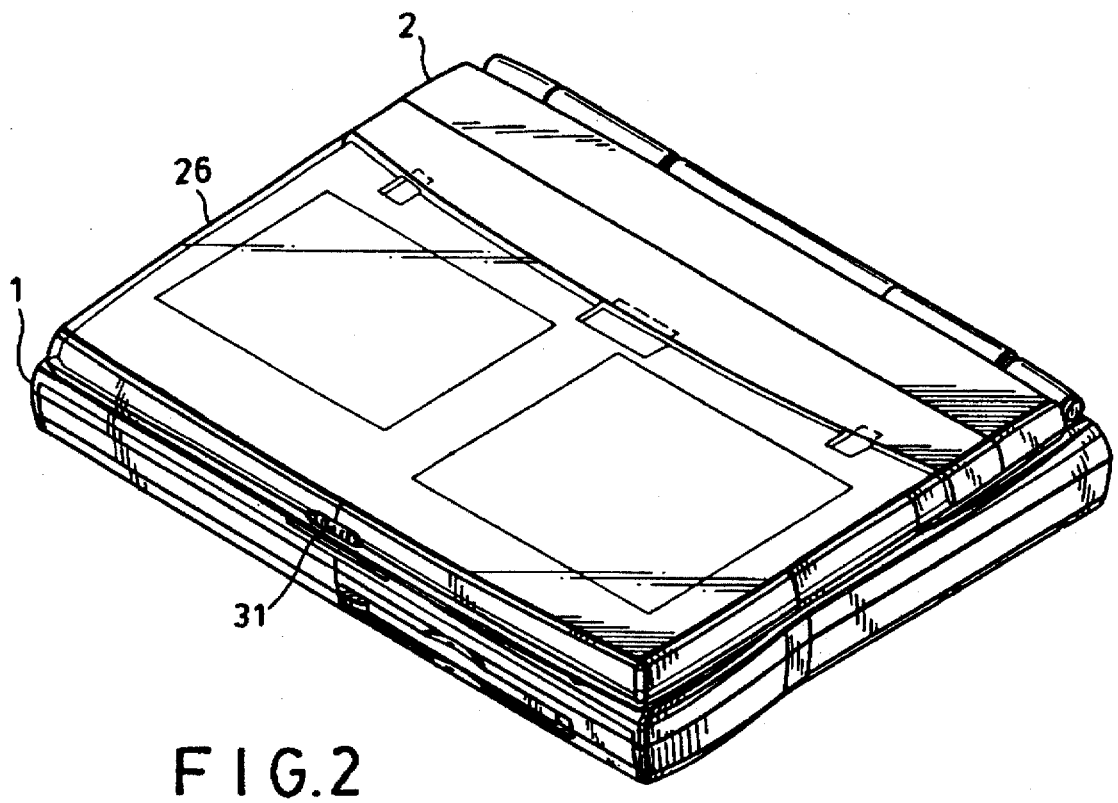
FIG. 2 is a schematic perspective view of the first preferred embodiment.
Figure 3:
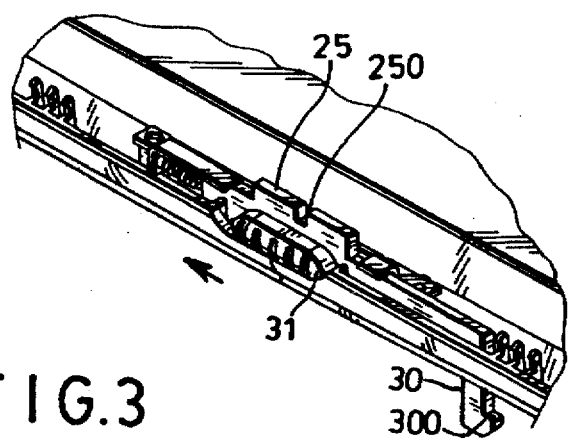
FIG. 3 is an enlarged view illustrating a portion of the first preferred embodiment.

Referring to FIGS. 1, 2 and 3, a first preferred embodiment of a portable computer according to the present invention includes a lower housing 1, an upper housing 2 and a lid member 26.

The lower housing 1 has an inner surface with keyboard device 10 provided thereon. A disk drive 11 and a battery unit 12 are inserted into the lower housing 1 through a front edge of the lower housing 1. The inner surface of the lower housing 1 is formed with a locking hole 13 adjacent to the front edge thereof.

The upper housing 2 has an inner surface with a display means 20 provided thereon. The upper housing 2 has a rear end portion connected pivotally to a rear end portion of the lower housing 1. Since the pivot connection between the upper housing 2 and the lower housing 1 can be achieved in various manners, a detailed description thereof is thus omitted herein.

The outer surface of the upper housing 2 is formed with a raised portion 21 adjacent to the rear end portion of the upper housing 2 so as to define a recessed portion 22 between the raised portion 21 and a front edge of the upper housing 2. The recessed portion 22 of the upper housing 2 is formed with three engaging holes 23 at one edge section bordering the raised portion 21. The engaging holes 23 are spaced from each other. The outer surface of the upper housing 2 is formed with a latch groove 24 at one edge section opposite to the raised portion 21. A second latch member 25 is mounted movably on the upper housing and extends into the latch groove 24. The second latch member 25 is associated operatively with a locking means 3 for locking the portable computer in a closed position, wherein the inner surfaces of the upper and lower housings, 2 and 1, abut against each other. The locking means 3 includes a hook member 30 which is extendible into the locking hole 13 of the lower housing 1 and which has a hooked end 300 that prevents disengagement of the hook member 30 from the locking hole 13 of the lower housing 1. The hook member 30 is normally biased to move from a first position, wherein removal of the hook member 30 from the locking hole 13 is permitted, to a second position, wherein removal of the hook member 30 from the locking hole 13 is prevented. A slidable actuator 31 is connected to the hook member 30 and is mounted slidably on the front edge of the upper housing 2. The slidable actuator 31 is operable to move the hook member 30 from the second position to the first position. The second latch member 25 is coupled with the hook member 30 so as to be movable synchronously with the hook member 30 and is formed with a notch 250 at a top end thereof.

The lid member 26 is mounted on the upper housing 2 so as to cover the recessed portion 22 in order to cooperate with the outer surface of the upper housing 2 to define a thin compartment for receiving a flat article therein. In the present embodiment, the lid member 26 is transparent. The lid member 26 has three engaging tabs 260 which extend therefrom and respectively into the engaging holes 23 of the upper housing 2. A first latch member 261 is provided on the lid member 26 and is extendible into the latch groove 24 when the second latch member 25 is in the second position. The first latch member 261 is aligned with the notch 250 of the second latch member 25 when the second latch member 25 is moved to the first position so as to be removable from the latch groove 24.

Figure 4:
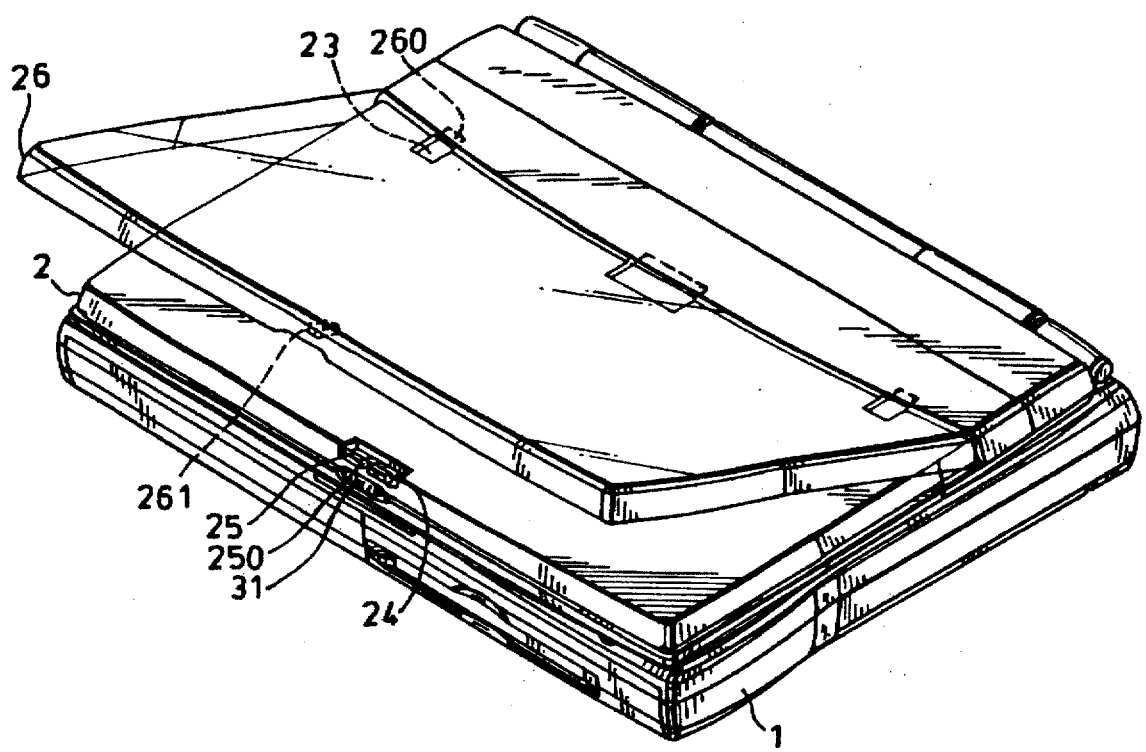
FIG. 4 is a schematic perspective view illustrating how a lid member is mounted on an upper housing of the first preferred embodiment.

Referring to FIG. 4, when mounting the lid member 26 on the upper housing 2, the engaging tabs 260 of the lid member 26 are firstly extended into the engaging holes 23 of the upper housing 2. Then, the second latch member 25 of the upper housing 2 is moved to the first position so as to permit extension of the first latch member 261 of the lid member 26 into the latch groove 24, thereby mounting the lid member 26 on the upper housing 2.

Since the lid member 26 is transparent, a picture, photograph, a disk or the like can be received in the thin compartment formed between the lid member 26 and the outer surface of the upper housing 2 for the purposes of identifying, enjoyment and convenience.

Figure 5:
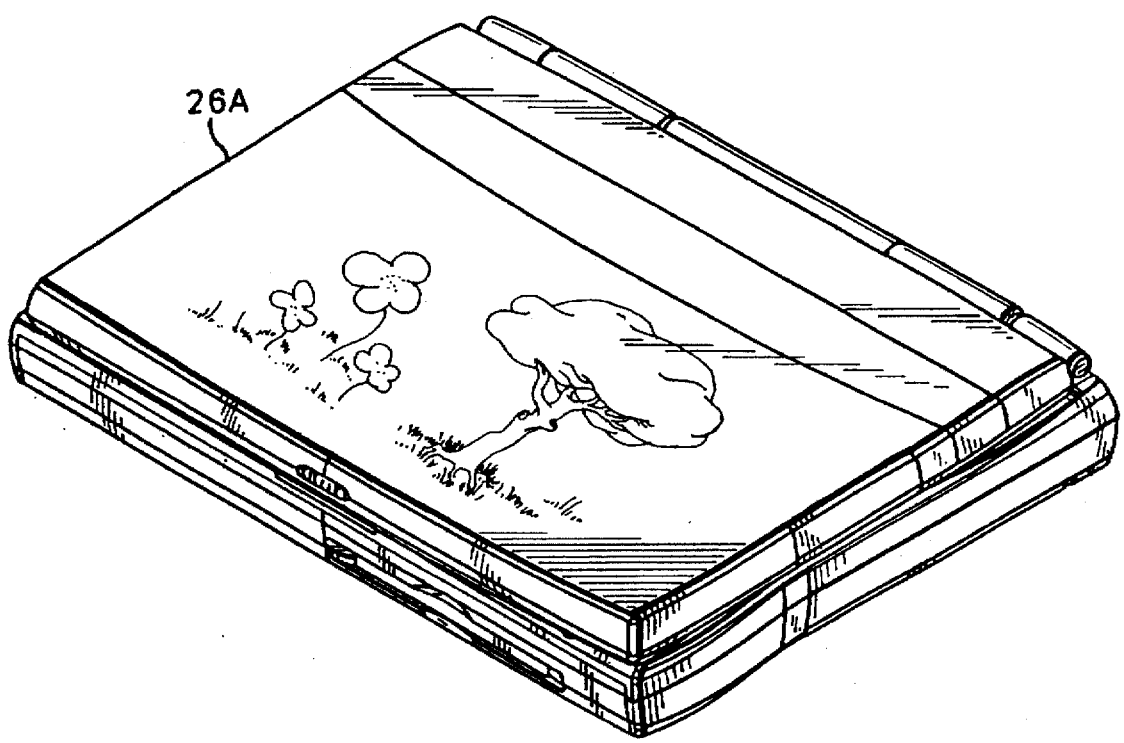
FIG. 5 is a schematic perspective view of a second preferred embodiment of a portable computer according to the present invention.

Referring to FIG. 5, a second preferred embodiment of the present invention is shown. Unlike the first preferred embodiment, the lid member (26A) is opaque such that the lid member (26A) can be painted as desired for the purposes of identifying and enhancing aesthetic appearance of the portable computer.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

We claim:

1. A portable computer comprising an upper housing which has an inner surface with a display means provided thereon, and a lower housing which is connected pivotally to said upper housing and which has an inner surface with a keyboard device provided thereon, wherein an outer surface of one of said upper and lower housings is formed with a raised portion so as to define a recessed portion adjacent to said raised portion and a lid member mounted thereon that cooperates with said outer surface so as to cover said recessed portion and form a thin compartment for receiving a flat article therein; said recessed portion having at least one engaging hole at one edge section bordering said raised portion and said lid member having at least one engaging tab extending therefrom and into said at least one engaging hole.

2. The portable computer of claim 1, wherein said outer surface of said upper housing is formed with a latch groove at one edge section opposite to said raised portion, said portable computer further comprising a first latch member provided on said lid member which is extendible into said latch groove, and a second latch member which is mounted movably on said upper housing which extends into said latch groove, said second latch member being selectively operable so as to permit removal of said first latch member from said latch groove.

3. The portable computer of claim 1, wherein said lid member is mounted on said upper housing.

4. The portable computer of claim 3, wherein said lid member is transparent.

* * * * *